Patented May 31, 1927.

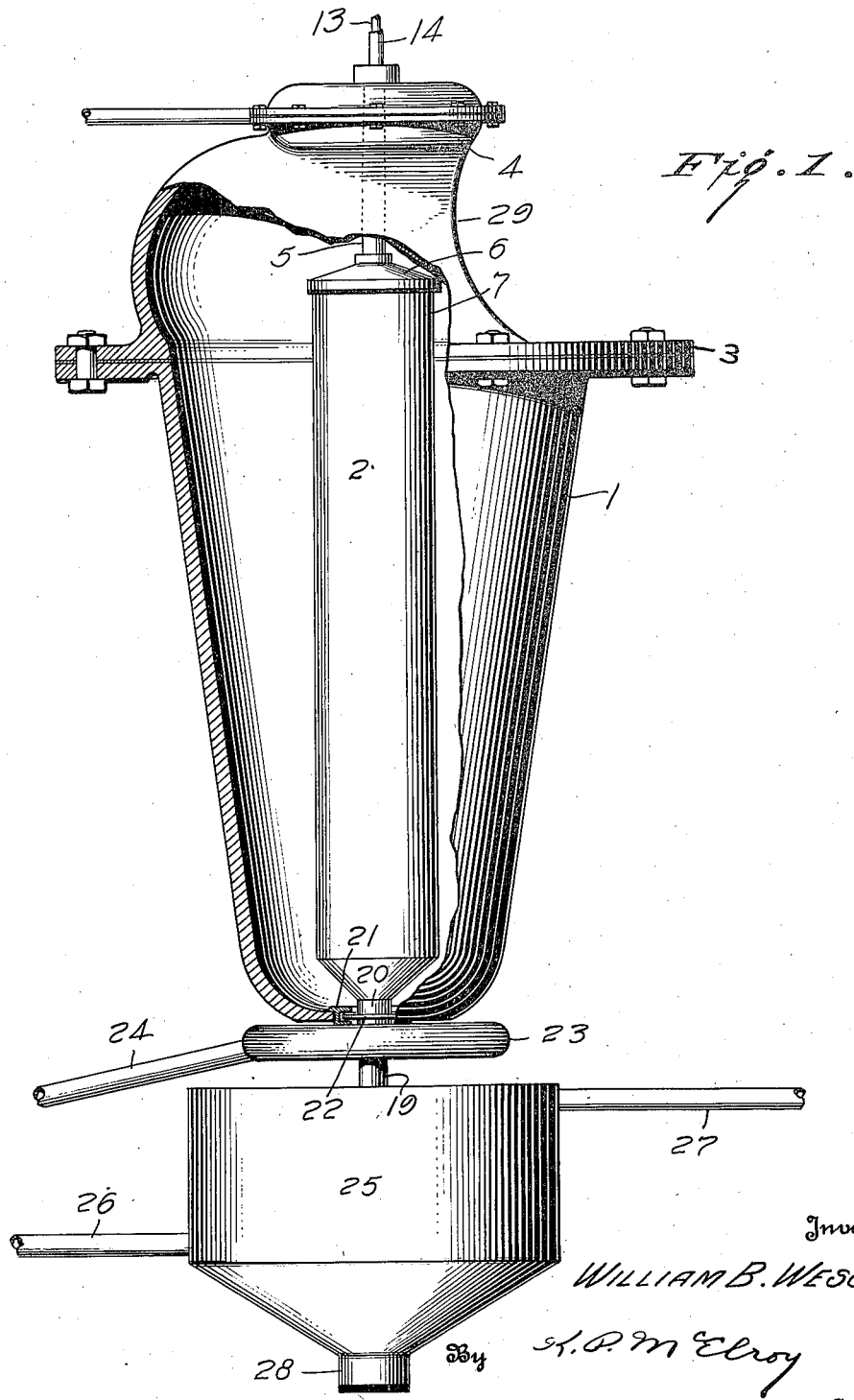

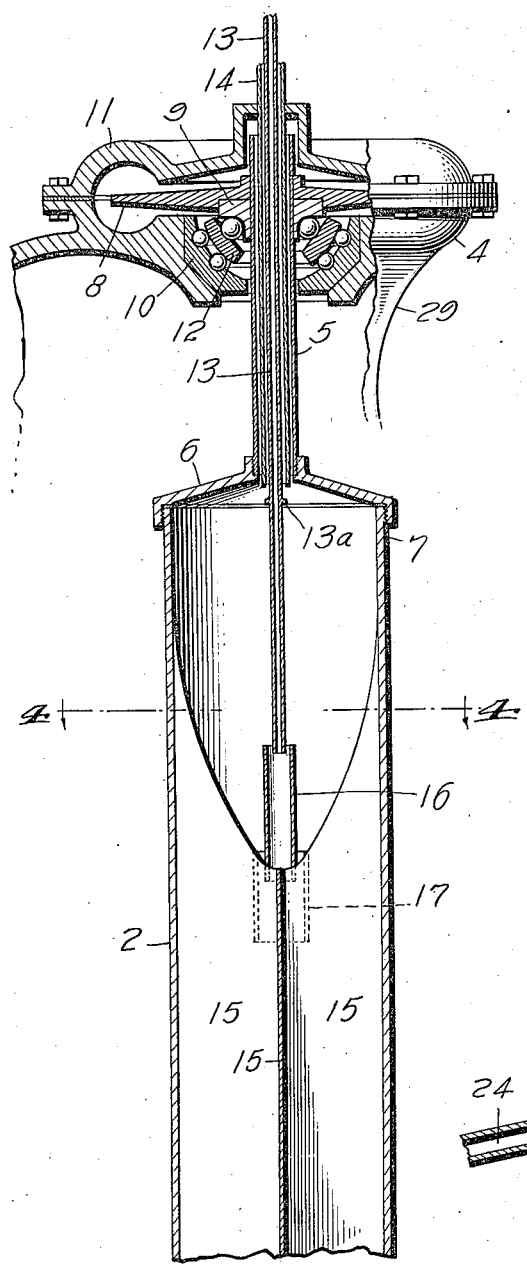
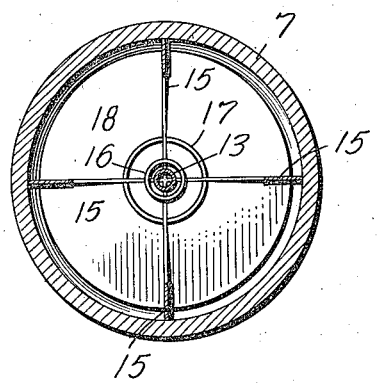
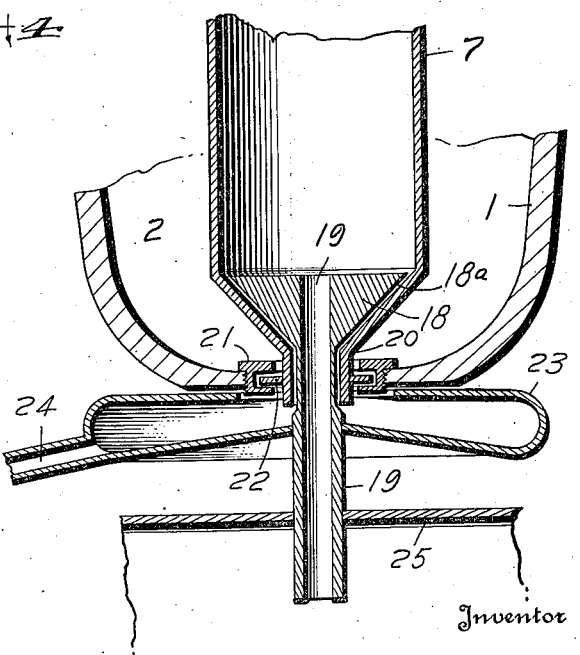

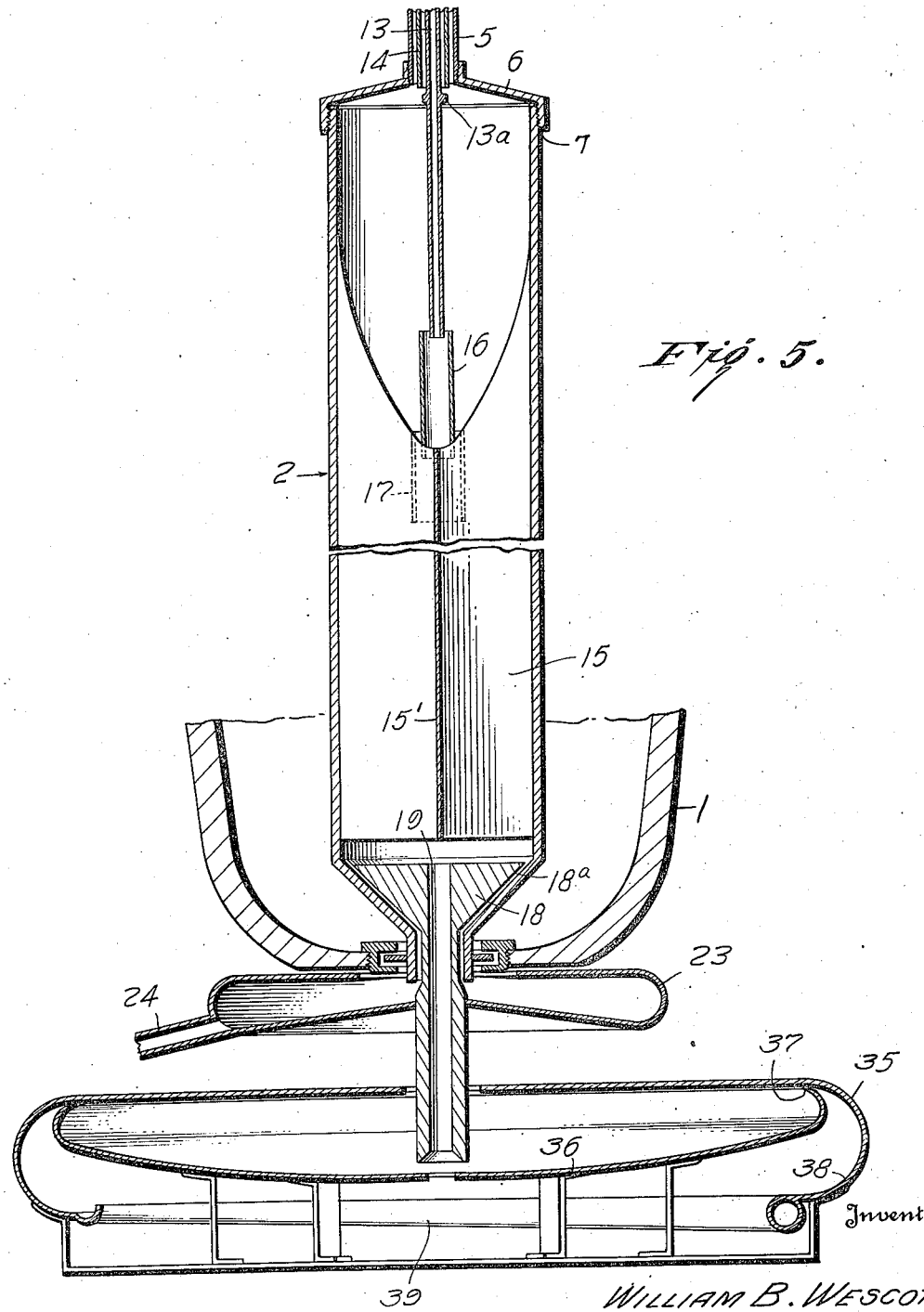

1,630,412

UNITED STATES PATENT OFFICE.

WILLIAM BURTON WESCOTT, OF DOVER, MASSACHUSETTS.

CENTRIFUGAL MACHINE.

Application filed November 7, 1925, Serial No. 67,614. Renewed December 1, 1926.

This invention relates to centrifugal machines; and it comprises a rotor, means for rotating it, means for feeding liquid material into the rotor in such a manner as to cause it to assume gradual rotational motion without substantial agitation, means for delivering a washing liquid to the concentric liquid layers within the rotor, means for discharging heavy liquid and washing liquid, and means for separately discharging separated light liquid without substantial agitation in such way that it is gradually deprived of its rotational velocity; all as more fully hereinafter set forth and as claimed.

While useful in many arts, the centrifugal liquid separator of the present invention is particularly useful in separating watery liquids from latex for the production of concentrated latex in the form of liquid, gelled or dry mass, as described in claimed in my copending applications, Serial No. 601,909 filed November 18, 1922 and No. 40,118 filed June 27, 1925; and for purifying and washing said latex. The apparatus of the present invention is adapted to deliver the purified latex either as a liquid or as gelled rubber; that is latex dried until rubber is separated in insoluble form.

In the accompanying drawings I have shown two forms of a specific embodiment of my invention.

Fig. 1 is a view partly in vertical section and partly in elevation of the centrifugal;

Fig. 2 is a partial vertical section through the apparatus of Fig. 1 at the top;

Fig. 3 is similarly a fragmental vertical section at the bottom of the apparatus shown in Fig. 1;

Fig. 4 is a horizontal section along line 4—4 of Fig. 2; and

Fig. 5 is a view similar to Fig. 1 of a modified form of apparatus.

The apparatus shown in Figs. 1 to 4 inclusive, is advantageously used for making dried or gelled latex, while the apparatus of Fig. 5 is best used to make and collect concentrated liquid latex.

In the several views, so far as applicable, the same reference numerals designate corresponding parts.

Referring particularly to Figs. 1 to 4, 1 indicates as a whole a casting and main frame for enclosing and supporting the rotor 2. The flanged housing 3 supports the entire mechanism. Rotor 2 is driven by turbine means indicated as a whole by 4 and it is driven and supported by hollow shaft 5, the support being through collar 6 detachably secured and gasketed to the rotor proper at 7. The turbine wheel 8 is attached to and concentric with a tube 5 and it runs on ball race bearings 9 and 10. Around the turbine wheel is the usual casting 11 provided with means for feeding steam, etc. Element 12 is a floating annular member with concave lower surface resting on the lower ball race and having a single ball race cut in its face. This floating intermediate member is free to rotate and oscillate on the two sets of ball bearings. The turbine and the tubular drive member 5 are provided with concentric tubes therein for supplying liquids to the rotor.

The innermost of these tubes 13 extends downwardly to a point well below the top of the rotor. This is surrounded by another tube 14 ending at a point near the top of the rotor with deflecting baffle means 13$^a$ below. The latter tube is for the supply of the latex and the former for the supply of washing liquid. The chamber within the rotor is unobstructed in its upper portion. At a point well below the top is the beginning of radial wings 15. As shown, these radial wings or vanes are cut away at the top and at a point lower down they extend to the axis of the machine. The shape of the vanes is so designed as to cause the upper edge of the vanes to lie along points of approximately uniform angular velocity in the latex. The upper edge, which starts at the periphery assures that all the latex below the point where the vanes join in the center shall be at the full angular velocity of the bowl without, however, stirring or causing eddies at the upper edge. Located around the lower end of pipe 13 is an axial sleeve tube 16, the upper portion surrounding the lower portion of 13. The lower end of 16 is in turn surrounded by a wider sleeve tube 17 extending down below the point at which the vanes come to the axis. At the lower end of the rotor and just below the lower end of the stated vanes, is a blocking out member 18 adapted to form flow-passages 18$^a$ with the coned lower end of the rotor; these flow passages extending from the periphery of the rotor chamber to a point nearer the axis. At the axis is depending discharge tube 19. In the showing of Figs. 1 and 3, this discharge tube 19 extends into a drying chamber 25, wherein the concentrated latex may be dried and gelled to such an extent as may be desirable. This drying casing may be of any usual type or character and is shown provided with air inlet 26 and outlet 27. At its base it is provided with collecting means 28 which may be of any suitable character. The lower end 20 of the rotor is journaled in bearing 21 provided with drag ring 22 adapted to permit slight lateral motion of the rotor. Below the elements just described is casing 23 adapted to receive the peripheral discharge of the rotor through flow-passages 18$^a$. This casing is provided with outlet 24.

The showing of Fig. 5 is identical with that of Fig. 1 as so far described, save that means are provided for receiving liquid latex from 19 and discharging it as such. Tube 19 is beveled off at the lower end to give a gradual change in direction. The latex is discharged on upwardly sloping bright metal surface 36 and passes over edge 37 into a collecting casing 35, flowing down over curved surface 38 to collector 39. Nickel plated metal may be used.

The main casing 1 is so shaped that should the rotor break away from its upper supporting member it will continue revolving within the casing and at the point where contact would come, the casing is strengthened by the flange 3. As shown in Fig. 1, the top of the casing is open at 29. The rotor can be removed through this opening after unscrewing the collar 6 at the top.

In the employment of the described apparatus, assuming it is to be used in concentrating latex, the rotor is started and allowed to reach its full speed. I then introduce water containing a little ammonia or a protective colloid through pipe 13; the amount of liquid so supplied being sufficient to fill the machine to the desired extent, forming an annulus rotating at high velocity. As the liquid emerges from 13 into 16 it is quickly brought up to the speed of the rotor, the friction of the walls of 16 picking it up. If desired, the interior wall of 16 may be provided with vanes (not shown). Leaving tube 16, the fluid passes against the inner surface of sleeve baffle 17, passing thence to the interior periphery of the rotor. When the rotor is almost filled, the fluid emerges through the outlet port 18$^a$ and the internal "level" (the radially inner surface of the annulus) of the rotating annulus is just below the edge of the central outlet port 19. I then introduce latex through the inlet pipe 14. The latex is directed across the short intervening space between the deflecting disc and the "level" of the fluid within the centrifuge. It is obvious that the body of liquor above the vanes is entrained only by the friction between it and the inner surface of the rotor, and hence the liquor at the "level" above the vanes will always move at an angular velocity much lower than that of the rotor itself; thus, the entering latex is not subjected to any violent agitation.

The vanes 15, starting at the periphery below the top, gradually increase in width and as gradually bring the whole mass of liquor within their influence up to the speed of the rotor, so that all the liquor within and below the tube 17 is at the speed of the rotor. The velocity however of course diminishes radially inwards from the periphery to the axis. The protective colloid solution being brought to the speed of the rotor within the tube 16, it flows thence in a thin horizontal film to the surface of the latex lying between the tube 17 and the inner concentric tube 16. At this point both latex and wash solution have the same angular velocity. The tube 17 serves to localize such slight disturbance as is caused by the addition of a washing liquid at this point. The action within the centrifugal may be said to be substantially the gradual application of increasing centrifugal force to a continuous stream of latex to be treated while in a rotor of a centrifugal operating continuously at a constant speed, and the addition of a wash solution, of specific gravity lower than that of latex serum, to the latex, the wash solution having, at the time of its addition, the same angular velocity as the partially concentrated latex. In another way of stating the same thing, the rotor is provided with a rotating internal liquid wall or annulus of replenished washing liquid and the centrifugal separation of the latex takes place along this wall. The centrifugal acts not only to concentrate the latex rubber globules and permit an effective displacement of the residual serum by an ammoniacal wash water or by a protective colloid wash solution, but also to discharge it again without violent mechanical agitation in the reduction of speed from the velocity near the axis to zero velocity. In the showing of Fig. 5, the beveling of the lower end of 19 permits the effluent to flow as an unbroken sheet, the velocity of which is gradually arrested on the dished member 36 concentric with 19.

Where the latex is to be gelled, a sufficient velocity is imparted to the concentrated product emerging from the centrifugal to produce a finely divided spray, susceptible of quick drying in contact with warm dry air. This drying is effected in 25. While it is ordinarily desirable that drying should be substantially complete before the sprayed particles reach the end of their fall in 25 and cohere, it is sometimes advantageous to limit the evaporation in drying to that just sufficient to produce a solid irreversible gel; subsequently completing the drying of the cohering sprayed particles in any convenient manner. Indeed, there may be so little evaporation in 25 as to allow drops of concentrated latex to reach the bottom in an ungelled state. In spray working, I usually pass the partially dried mass, obtained from the spray chamber, through a set of ordinary creping rolls and then either hang the resulting sheets of creped rubber to dry in suitably ventilated drying lofts, or place the sheets on the shelves of an ordinary vacuum dryer of the shelf type. Dried gel rubber obtained from latex in the manner described is rubber, but of different characteristics from that of coagulated rubber. It does not have the reticulate structure of the latter. And this gel contains materially less of the non-rubber constituents of the latex than that produced by drying untreated latex; and it may, and advantageously does, contain substantially none. In properties, the purified gel rubber of the present invention is nearer plasticized rubber than plantation crepe made from coagulated rubber.

What I claim is:

1. A centrifugal machine liquid separator for the separation of composite liquids into light and heavy components, comprising a rotor, means for supporting and rotating the same, means for supplying liquid to be separated to the rotor, means for facilitating separation within the rotor and means for supplying a washing liquid to the lighter layer during such separation and means for discharging separated liquids at different points.

2. A centrifugal machine comprising a support, a rotor, means for rotating the same, means for feeding liquid material in such a manner as to cause it to assume gradual rotational motion and produce gradual separation without substantial agitation, means for delivering a washing liquid to the lighter of the concentric liquid layers within the rotor during such separation, means for discharging heavy liquid and washing liquid and means for separately discharging separated light liquid without substantial agitation.

3. A centrifugal machine comprising a support, a rotor, means for rotating the same, means for feeding liquid material thereto, means within the rotor for causing said liquid material to assume gradual rotational motion and produce gradual separation without substantial agitation, means within said liquid feeding means for delivery of a washing liquid to the lighter of the concentric liquid layers within said rotor during such separation, means for discharging heavy liquid and washing liquid and means for separately discharging separated light liquid.

4. A centrifugal machine comprising a support, a rotor, means for rotating the same, means for feeding liquid material thereto, means within the rotor for causing said liquid material to assume gradual rotational motion and produce gradual separation without substantial agitation, means within said liquid feeding means for delivery of a washing liquid to the lighter of the concentric liquid layers within said rotor during such separation, means for discharging heavy liquid and washing liquid and means for separately discharging separated light liquid without substantial agitation.

5. A centrifugal machine comprising a support, a rotor carried thereby, means for rotating the rotor, concentric means for supplying different liquids to the rotor, one such means supplying washing liquid to the other liquid during separation into light and heavy liquid, and means for discharging separated light liquid and heavy liquid at different points.

6. A centrifugal machine comprising a support, a rotor carried thereby, means for rotating the rotor, means for feeding liquid material in the rotor in such a manner as to cause it to assume gradual rotational motion without substantial agitation, concentric means for delivering a washing liquid to the rotor to a point where separation is taking place, means for discharging heavy liquid at one point and means at a lower point for discharging light liquid in such manner as to gradually deprive it of rotational velocity.

7. A centrifugal machine comprising a support, a rotor carried thereby, means for rotating the rotor, means for concentrically supplying different liquids to said rotor, one such liquid being supplied to the other such liquid at the point where separation is taking place, means causing gradual rotational motion of said liquids without substantial agitation, means for discharging separated liquids at different points, the means for discharging separated light liquid comprising a device gradually depriving such liquid of its rotational velocity.

8. A centrifugal machine comprising a support, a rotor carried thereby, means for rotating the rotor, means for feeding liquid to be separated interiorly of the rotor, vanes in the rotor arranged to gradually impart rotational velocity to the liquid without substantial agitation of the same, additional means for feeding a second liquid interiorly of the rotor, and means for separately discharging separated light liquid and heavy liquid, the discharging means for the light liquid comprising a pan-like device provided with overflow means.

9. The combination with a centrifugal machine having means for feeding liquid thereto and means for discharging heavy separated liquid at one point and the light separated liquid at another point, of means for gradually reducing the rotational velocity of one of the separated liquids, said means comprising a receptacle like device having gradually sloping sides and provided with overflow means to collect the liquid after it flows over said sides.

10. A centrifugal machine comprising a rotor and means for rotating the same, means for introducing a plurality of liquids into the rotor and separated liquid discharging means and vanes in the rotor for bringing the liquid up to speed, such vanes extending from the periphery inwardly of the rotor and gradually increasing in width from a point approximating the liquid introduction point to a point near the liquid discharge point.

11. A centrifugal machine comprising a support, a rotor carried thereby, means for rotating the rotor, means for feeding liquid into the rotor, vanes in the rotor extending from the inner periphery toward the center of the rotor for causing the liquid to assume gradual rotational motion without substantial agitation, means for discharging separated heavy and light liquids and means for gradually reducing the rotational velocity of one of the separated liquids, said means comprising a receptacle-like device having gradually sloping sides and provided with overflow means to collect the liquid after it flows over said sides.

12. A centrifugal machine comprising a rotor and means for rotating the same, means for introducing liquids to the rotor and separate liquid discharging means, vanes in the rotor for bringing introduced liquid up to the speed of the rotor, means beneath a liquid introducing means for deflecting the liquid to the peripheral walls of the rotor whereby said liquid will be gradually brought up to the speed of the rotor.

13. In a centrifugal machine for separating composite liquids into lighter and heavier components, a rotor, means for introducing the composite liquid into the rotor and gradually developing rotational velocity therein, and means for introducing washing liquid into the rotor, such introducing means being arranged to bring the introduced washing liquid to a rotational velocity substantially equal to the rotational velocity of the liquid undergoing separation at the point of contact.

14. In a centrifugal machine having a rotor and means for rotating it, means for introducing liquids at two different points, one of said liquid introducing means arranged to gradually bring liquid introduced by it up to a rotational speed substantially equivalent to the rotational speed of the liquid in the machine prior to the contacting of such introduced liquid with the liquid introduced by the other means, said liquid introducing means comprising a tube centrally positioned within the rotor, an axial sleeve tube surrounding the lower end of said tube, and a second tube surrounding the lower end of the axial sleeve tube.

15. In a centrifugal machine having a rotor and means for rotating it, means for introducing liquids at two different points, one of said liquid introducing means arranged centrally within said rotor provided with telescoping tubes on the lower end thereof, said sleeves being secured to the upper edge of said rotor whereby such introduced liquid will be gradually brought up to a rotational velocity equal to the rotational velocity of the liquid already in the machine.

In testimony whereof, I have hereunto affixed my signature.

WILLIAM BURTON WESCOTT.